United States Patent [19]

Asatsuma et al.

[11] Patent Number: 5,187,223
[45] Date of Patent: Feb. 16, 1993

[54] PNEUMATIC TIRES

[75] Inventors: Keiji Asatsuma; Yasuhito Inoue; Akitoshi Kondo, all of Niigata, Japan

[73] Assignee: Asahi Carbon Co., Ltd., Niigata, Japan

[21] Appl. No.: 634,651

[22] Filed: Dec. 27, 1990

[30] Foreign Application Priority Data

Dec. 27, 1989 [JP] Japan ................................ 1-339488

[51] Int. Cl.⁵ .............................................. C08K 3/04
[52] U.S. Cl. .................................... 524/496; 524/495
[58] Field of Search ............... 524/495, 496, 502, 515, 524/525, 571, 575.5

[56] References Cited

U.S. PATENT DOCUMENTS

| | | | |
|---|---|---|---|
| 4,644,988 | 2/1987 | Ahmad et al. | 524/496 |
| 4,678,830 | 7/1987 | Sato et al. | |
| 4,703,079 | 10/1987 | Ahmad et al. | 524/495 |
| 4,748,168 | 5/1988 | Kawakami et al. | 524/474 |

FOREIGN PATENT DOCUMENTS

60-072939 10/1986 Japan .

OTHER PUBLICATIONS

"Handbook of Fillers and Reinforcements for Plastics"; Katz and Milewski, eds.; Van Nostrand Reinhold (1978) pp. 277–281.

*Primary Examiner*—Paul R. Michl
*Assistant Examiner*—Edward J. Cain
*Attorney, Agent, or Firm*—Sughrue, Mion, Zinn Macpeak & Seas

[57] ABSTRACT

In a pneumatic tire, a tread portion is comprised of a rubber composition containing 30–70 parts by weight of carbon black powder having particular properties based on 100 parts by weight of rubber component.

6 Claims, 1 Drawing Sheet

FIG_1
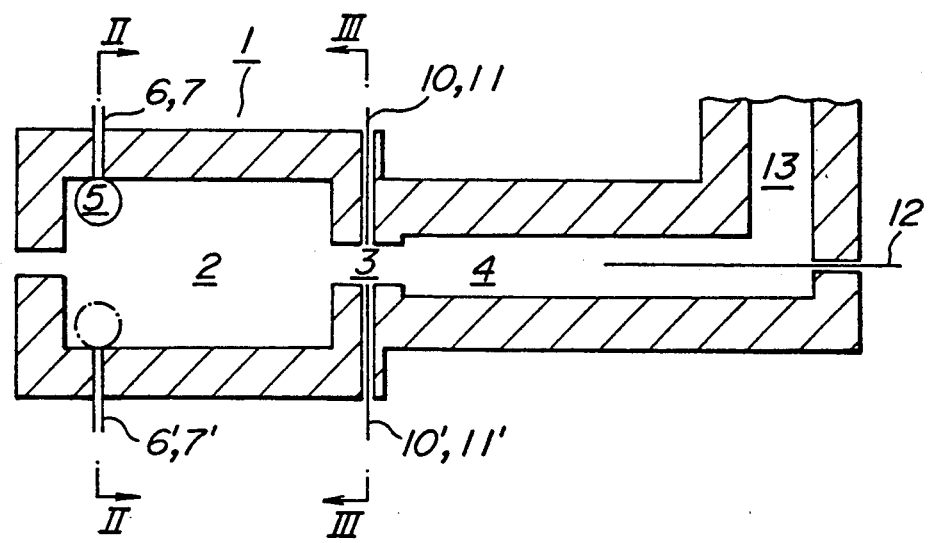
FIG_2
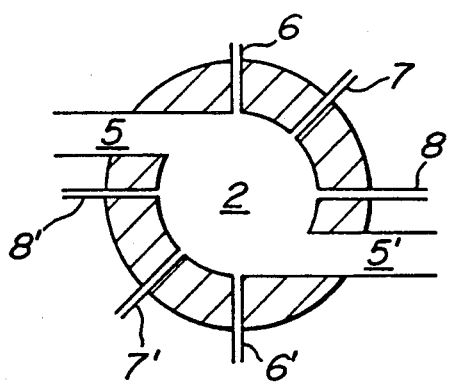
FIG_3
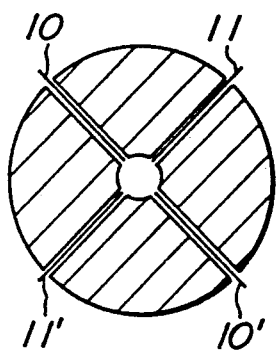

PNEUMATIC TIRES

BACKGROUND OF THE INVENTION

1. Field of the Invention

This invention relates to pneumatic tires, and more particularly to a pneumatic tire having improved rolling resistance and wear resistance by constituting a tread portion with a particularly rubber composition.

2. Related Art Statement

It is well-known that tires for automobiles causes self-heat generation thereinside during the running. Such an internal heat generation increases the rolling resistance of the tire. Recently, it is largely demanded to decrease the rolling resistance of the tire from a viewpoint of energy-saving and resources-saving, and consequently the need on rubber compositions having a low heat generating property is more increased.

In general, in order to provide a rubber composition for tire tread or the like having a high fracture resistance, it is desired to use a carbon black having a high specific surface area. The specific surface area is usually determined by calculating from an adsorption amount of nitrogen gas molecule (hereinafter referred to as $N_2SA$).

However, when a carbon black, having such a high specific surface area that $N_2SA$ exceeds about 120 $m^2/g$, is used as a filler for reinforcing a elastomer such as rubber or the like, an interrelation between specific surface area and reinforcing performance is not established, and the reinforcing performance remains lower than the expected value. Furthermore, when $N_2SA$ exceeds 140 $m^2/g$, the reinforcing performance is rapidly lowered in some cases.

This is considered to be due to the fact that as the specific surface area becomes high, the dispersibility of carbon black into the elastomer phase degrades and the reinforcing performance inherent to the filled carbon black can not sufficiently be developed and hence the effective bonding state to rubber can not be formed.

In addition, when the rubber composition is used in a site repeatedly subjected to deformation such as tire tread or the like, it is simultaneously required to have a hysteresis loss accompanied with the repeated deformation or a proper dynamic viscoelasticity together with the aforementioned wear resistance.

The inventors have already found that the dispersibility into rubber is improved without the degradation of the reinforcing performance by specifying a ratio of iodine adsorption value to $N_2SA$ and an existing ratio of a relatively large size portion of aggregate size in carbon blacks having a very large specific surface area ($N_2SA$: 200-280 $m^2/g$), which has previously been filed (Japanese Patent laid open No. 61-34072).

On the other hand, in order to provide a rubber composition having a low heat generation, it has hitherto been attempted to reduce an amount of a softening agent such as oil or the like, or to change or reduce a reinforcing agent such as carbon black or the like.

However, the aforementioned carbon black proposed by the inventors has the drawback that the use range is extremely restricted because the specific surface area largely exceed the value of the conventional wear-resistant carbon black. Furthermore, the dispersibility is improved, but the improvement of dynamic viscoelasticity is still unsatisfactory.

On the other hand, the reduction of the amount of the softening agent considerably increases the viscosity of the rubber composition, which brings about the degradation of the processability such as kneading or the like. Further, the reduction of the amount of the reinforcing agent or the change to a reinforcing agent having a small reinforcement undesirably decreases a modulus of elasticity, fatigue resistance, particularly wear resistance for rubber.

Thus, there is no technique simultaneously and sufficiently establishing the properties such as low heat generation, good wear resistance and processability up to the present.

SUMMARY OF THE INVENTION

The inventors have made studies on colloidal property as well as surface functional group of carbon black in order to solve the above drawbacks and found that the object is attained by using a rubber composition containing a particular carbon black in the tire tread, and as a result the invention has been accomplished.

According to the invention, there is the provision of a pneumatic tire comprising a tread portion, a pair of sidewall portions and a pair of bead portions, characterized in that said tread portion is comprised of a rubber composition comprising (A) 100 parts by weight of at least one rubber selected from the group consisting of natural rubber and diene series synthetic rubbers and (B) 30-70 parts by weight of powdery carbon black having a specific surface area of nitrogen adsorption ($N_2SA$) of 125-250 $m^2/g$ and a DBP absorption number of compressed sample (24M4DBPA) of 80-140 ml/100 g and containing surface functional groups that amount of functional group acetylating with acetic anhydride (ACF) and amount of functional group reacting with hydroxyamine to form oxime (OXF) satisfy a relation represented by the following equation (1)

$$ACF \geqq 0.125 + 2 \times OXF \tag{1}$$

wherein ACF and OXF indicates milliequivalent per 1 g of carbon black (meq/g).

In a preferred embodiment of the invention, hydrogen ion concentration of carbon black in a suspension slurry (pH) and total acidity calculated from neutralizing reaction with aqueous solution of sodium hydroxide (TA) in the powdery carbon black satisfy a relation represented by the following equation (2)

$$pH \geqq 4.5 + 100 \times TA \tag{2}$$

wherein TA indicates milliequivalent per 1 g of carbon black (meq/g).

DESCRIPTION OF THE PREFERRED EMBODIMENTS

According to the invention, it is essential that the amounts of acetylation functional group and oxime-forming functional group satisfy the equation (1) and further the equation (2) in order to simultaneously establish the wear resistance and the dynamic viscoelasticity.

When the above condition is not satisfied, even if carbon black powder is not subjected to a treatment after the granulating process so as not to affect the surface functional groups, the improving effect of the wear resistance is recognized, but the large improving effect on the low heat generation is not developed. Moreover, ACF is desirable to be 0.05 meq/g or more from the calculated value.

The ranges defined in the fundamental properties of the powdery carbon black are inevitable in order to develop the good wear resistance and reinforcing property When $N_2SA$ is less than 125 m²/g, the wear resistance tends to lower of the loaded rubber, while when it exceeds 250 m²/g, the improving effect of the wear resistance hardly develops in proportion to the increase the specific surface area, so that the $N_2SA$ is limited to a range of 125–250 m²/g in the invention. On the other hand, when 24M4DBPA is less than 80 ml/100 g, the wear resistance also tends to lower, while when it exceeds 140 ml/100 g, heat generation becomes large in the kneading and the viscosity of the uncured composition becomes higher to extremely decrease the processability, so that the 24M4DBPA is limited to a range of 80–140 ml/100 g.

According to the invention, the amount of the powdery carbon black added is required to be within a range of 30–70 parts by weight per 100 parts by weight of rubber. When the amount is less than 30 parts by weight, the sufficient wear resistance is not obtained, while when it exceeds 70 parts by weight, the sufficient dispersion of powdery carbon black is not obtained, and the improvement of the wear resistance is not sufficiently attained in proportion to the addition amount, and also the heat generation largely degrades.

In the invention, it is preferable that the powdery carbon black satisfies a relation between total acidity (TA) and hydrogen ion concentration in the suspension slurry (pH) represented by the following equation:

$$pH \geqq 4.5 + 100 \times TA.$$

Furthermore, it is desirable that pH is 1.0 or more from the calculated value of TA.

Moreover, the rubber usable in the invention is at least one rubber selected from the group consisting of natural rubber and diene series synthetic rubbers and is preferably a rubber matrix consisting of natural rubber and styrene-butadiene rubber (SBR) having a bound styrene content of not less than 20% at a blending ratio of 100:0–10:90 or a rubber matrix consisting of natural rubber and butadiene rubber (BR) having a cis-1,4-bond content of not less than 80% at a blending ratio of 100:0–30:70. In case of, for example, tires for truck and bus, the use of the above rubber improves the wear resistance and low heat generation. Furthermore, the cut resistance is improved and the uneven wear resistance in the tire mounted on a front wheel can be improved by blending SBR at the above blending ratio. Moreover, the wear resistance in the tire mounted on a rear wheel is largely improved by blending BR at the above blending ratio.

By satisfying the above conditions can be provided pneumatic tires having the wear resistance and low heat generation considerably higher than the tire made from the rubber composition using the conventional carbon black.

The physical and chemical properties of the carbon black used in the invention are measured as follows:

i) DBP absorption number of compressed sample (24M4DBPA)

It was measured according to a method of ASTM D3493-88 and represented by ml of dibutyl phthalate (DBP) absorbed in 100 g of carbon black after compression treatment (ml/100 g).

ii) Specific surface area of nitrogen adsorption ($N_2SA$)

It was measured according to a method of ASTM D3037-88 B and represented by surface area per 1 g of carbon black (m²/g).

iii) Hydrogen ion concentration (pH)

It was measured according to a method of ASTM D1512-84 A.

iv) Total acidity (TA)

About 1 g of carbon black was accurately weighed and placed in a flask, to which was added 50 ml of an aqueous solution of 1/250 normal sodium hydroxide and sufficiently dispersed thereinto by a supersonic treatment. Then, the flask was provided with a reflux condenser which was placed on a mantel heater and the mixture was boiled for 2 hours. After the completion of reaction, the product was allowed to cool to room temperature and transferred into a graduated flask of 100 ml, to which was added a distilled water to a content of 100 ml. After the resulting solution was filtered through a membrane filter having an open pore size of 0.2 μm, a filtrate was subjected to a neutralization titration with an aqueous solution of 1/500 normal hydrochloric acid having a well-known titer value, adding a mixture of methyl red and bromocresol green as an indicator, during which a titration value was read (which was a ml). Separately, a blank test using no carbon black was carried out in the same manner as described above to measure a titration value (b ml).

The total acidity (TA) was calculated according to the following equation:

$$TA = f \times (b-a) \times 1/500 \times (100 - W/P)/(C \times W)$$

wherein
f: titer value of aqueous solution of 1/500 normal hydrochloric acid used in titration
W: sample weight (g)
P: density of carbon black (1.86 g/cc)
C: amount of filtrate used in titration (ml)
a: titration value of sample (ml)
b: titration value of blank test (ml) TA is represented by milliequivalent (meq/g) per 1 g of carbon black.

v) Quantitative determination of acetylated functional group (ACF)

① Preparation of acetylated carbon black

Into an Erlenmeyer flask containing about 2 g of carbon black were charged 20 ml of pyridine and 10 ml of acetic anhydride, and a condenser provided with a calcium chloride tube was placed into the inlet of the flask and an oxygen-removing device was connected to the tube. The contents of the device was exchanged for nitrogen atmosphere by the flow of nitrogen gas.

The flask was placed into an oil bath held at 120° C. to conduct reaction at this temperature for 15 hours.

After the completion of the reaction, 100 ml of distilled water was added to the product with cooling to decompose an excessive amount of acetic anhydride, and then an acetylated carbon black was isolated through suction filtration and washed with about 300 ml of distilled water.

After the washing, the acetylated carbon black was placed in a drier held at 105° C. and dried to a constant weight.

② About 1 g of the acetylated carbon black was accurately weighed and placed in a beaker, to which was added a solution of 2 g of barium hydroxide in 20 ml of warmed distilled water. The beaker was placed in a water bath of 100° C. to conduct hydrolysis for 5 hours. The product was allowed to cool to room temperature and filtered through suction with a membrane filter. After the beaker and filter were washed with a small amount of distilled water, the filtrate and washed liquid were combined together and passed down through a column of a cation exchange resin, Amberite IR120 (trade name, made by Organo Kabushiki Kaisha) activated with hydrochloric acid to isolate acetic acid and then the column was washed until the acidity of acetic acid was not observed.

30 ml of the eluate was titrated with an aqueous solution of 1/500 normal sodium hydroxide using a mixed indicator of methyl red and bromocresol green.

Prior to the titration, a calibration curve was previously prepared with a standard solution of 1/500 normal acetic acid, and then an amount of acetic acid was determined from the titrated value using the calibration curve.

The milliequivalent of the acetylated reaction functional group (ACF) per 1 g of carbon black was calculated according to the following equation:

ACF(meq/g) = amount of acetic acid from calibration curve (ml) $\times f \times 2 \times 10^2$/weight of acetylated carbon black (g)

wherein f is titer value of the standard solution of acetic acid.

vi) Quantitative determination of oximed reaction functional group (OXF)

1) Preparation of oximed carbon black

There were provided two Erlenmeyer flasks each containing about 1.5 g of carbon black, one of which flasks was added with 1 g of hydroxylamine hydrochlorate dissolved in 20 ml of pyridine and the other of which flasks was added with 20 ml of pyridine. A condenser provided with a calcium chloride tube was placed into the inlet of each of the flasks and an oxygen-removing device was connected to the tube. The contents of the device was exchanged for nitrogen atmosphere by the flow of nitrogen gas.

The flask was placed in an oil bath held at 100° C. to conduct reaction for 16 hours.

After the completion of the reaction, 50 ml of 3 normal hydrochloric acid was added to the product to neutralize an excessive amount of hydroxylamine. The product was filtered through suction to separate an oximed carbon black, which was washed with about 300 ml of distilled water. The product was placed on a filter paper of No. 5B and further washed with 300 ml of distilled water.

After the washing, the oximed carbon black was placed in a drier held at 105° C. and dried to a constant weight. (Similar procedure was carried out with respect to a blank sample.)

2) Quantitative determination of nitrogen amount

① Preparation of sample for quantitative determination

About 0.2 g of each of oximed carbon black and control carbon black was accurately weighed and placed into a semi-micro Kjeldahl decomposition bottle, to which were charged 2.6 g of calcium sulfate and 0.02 g of mercuric oxide and finally 4 ml of concentrated sulfuric acid was added, respectively.

The decomposition bottle was mounted onto a semi-micro Kjeldahl decomposition device and gas was ignited while passing water through an aspirator for suctioning exhaust gas. The intensity of the flame was first made weak so as not to boil the reactant in the bottle, and then it was gradually made strong up to an extent boiling the reactant when the occurrence of white smoke in the bottle was less.

After the reactant in the bottle was completely transparent, it was further strongly heated for 1 hour. Turning of the gas, the product was cooled in air, then the bottle was dismounted from the decomposition device and about 10 ml of distilled water was gradually charged thereinto. The product was placed in a sample flask of a semi-micro Kjeldahl nitrogen distillation device and a small amount of water was added several times for washing.

② Determination of nitrogen amount

The sample flask was mounted onto a distillation device and a beaker containing 5 ml of 2% boric acid solution was connected to an outlet of a condenser mounted onto the distillation device.

From an alkali pouring port of the distillation device was charged 25 ml of a solution of sodium hydroxide and sodium thiosulfate (50%.5%), and then the pouring port and distillation port were closed to conduct distillation for 9 minutes. A solution of 2% boric acid containing ammonia was titrated with 1/100 normal hydrochloric acid.

A calibration curve was prepared in the same manner as described above by using a solution of ammonium sulfate having a known nitrogen amount, and then milliequivalent of nitrogen was measured from the titrated amount of the sample and the calibration curve and milliequivalent of oximed reaction functional group (OXF) per 1 g of carbon black was calculated according to the following equation:

OXF = (nitrogen amount of oximed carbon black/weight of oximed carbon black) − (nitrogen amount of control carbon black/weight of control carbon black)

BRIEF DESCRIPTION OF THE DRAWINGS

The invention will be described with reference to the accompanying drawings, wherein:

FIG. 1 is a longitudinal section view of an example of proper embodiment of a furnace used for producing the carbon black according to the invention;

FIG. 2 is a cross sectional view taken along a line II—II of FIG. 1; and

FIG. 3 is a cross sectional view taken along a line III—III of FIG. 1.

The following examples are given in illustration of the invention and are not intended as limitations thereof.

PRODUCTION EXAMPLE

The carbon black used in the invention was prepared by using the furnace shown in FIG. 1 to 3 as follows.

A furnace 1 was used for the production of carbon black comprising a cylindrical combustion chamber (inner diameter: 325 mm, length: 550 mm) and two first air conduits 5,5' disposed in the front half portion of the chamber 2 and having a center at a position in tangential direction of the chamber (inner diameter: 115 mm, fuel may be introduced), six second fuel conduits 6,6', 7,7', 8, 8' radially arranged in the front half portion independently of the first conduits (inner diameter: 23 mm), a venturi portion 3 axially connected to the combustion chamber 2 and having the narrowest diameter of 80 mm and a length of 150 mm, four pipes 10, 10', 11, 11' for introducing feedstock oil radially arranged at a position of 80 mm downward from the upstream edge of the venturi portion 3 (inner diameter of 10 mm), a reaction-continuing and simultaneously cooling chamber 4 axially connected to the venturi portion 3 (inner diameter: 160 mm, length: 2000 mm), a cooling water conduit pipe 12 inserted from the downstream end of the chamber 4 and capable of adjusting the spraying position of water (inner diameter: 10 mm) and the flue 13 connected at an angle of 90° to the rear end portion of chamber 4, the whole furnace being covered with a refractory.

Carbon blacks having different specific surface areas and surface chemical properties were obtained by properly selecting supply conditions of air and fuel gas (liquefied petroleum gas) from the first and second conduits, supply conditions of the feedstock oil from the introducing conduit, pressure condition in the introducing of the feedstock oil and the position of the cooling water conduit pipe, wherein 24M4DBPA was controlled to a given value by using a well-known alkali metal catalyst.

The powdery carbon black according to the invention can be obtained at any position ranging form the reaction furnace to an inlet of a granulator at the carbon black production processes. In this example, the powdery carbon black was taken out from the inlet portion of the granulator.

The physical and chemical properties of the feedstock oil used are shown in Table 1, and the production conditions and the physical and chemical properties of the resulting carbon blacks are shown in Table 2.

TABLE 1

| | |
|---|---|
| Specific gravity (JIS K 2249) (15/4° C.) | 1.1310 |
| Kinetic viscosity (JIS K 2283) (cSt at 50° C.) | 16.8 |
| BMCI (Bureau of Mines Correlation Index) | 160 |
| Initial boiling point (°C.) | 202 |
| Mid-boiling point (°C.) | 339 |

TABLE 2

| Run No. | 1 | 2 | 3 | 4 |
|---|---|---|---|---|
| Feed oil rate (l/hr) | 165 | 168 | 168 | 170 |
| Feed oil pressure (kg/cm$^2$) | 32 | 30 | 50 | 55 |
| Feed LPG rate (kg/hr) | 33 | 33 | 47 | 44 |
| Total air rate (kg/hr) | 1,000 | 1,000 | 1,000 | 1,000 |
| Spray position of cooling water (mm from pipes 10 ~ 11' to pipe 12) | 910 | 910 | 750 | 850 |
| Appearance | granule | powder | powder | powder |
| 24M4DBPA (ml/100 g) | 101.0 | 101.3 | 102.1 | 102.3 |
| N$_2$SA (m$^2$/g) | 150.5 | 150.8 | 149.9 | 151.0 |
| ACF (meq/g) | 0.223 | 0.232 | 0.284 | 0.266 |
| OXF (meq/g) | 0.056 | 0.060 | 0.048 | 0.061 |
| pH | 6.7 | 7.7 | 7.7 | 8.2 |
| TA (meq/g) | 0.044 | 0.028 | 0.024 | 0.020 |
| Calculating value of equation (1) | 0.237 | 0.245 | 0.221 | 0.247 |
| Calculating value of equation (2) | 8.9 | 7.3 | 6.9 | 6.5 |

EXAMPLE

The wear resistance and heat generating property of pneumatic tires were evaluated by measuring Lambourn wear for the former and tan δ for the latter in various rubber compositions used for tire tread.

A part of the rubber compositions was used to retread TBR tire having a tire size of 1000 R20 by recapping method, which was actually run on the road over a distance of 40,000 km. Thereafter, the running wear resistance was evaluated by measuring the remaining groove depth. In this case, it was represented by an index on the basis that Comparative Example 1 was 100.

Moreover, the test conditions of rubber properties were as follows:
(1) Vulcanization conditions: 145° C. × 30 minutes
(2) Test for wear resistance: It was measured at a slip ratio of 60% by means of a Lambourn abrasion tester, and the index of wear resistance was calculated according to the following equation:

$$\text{Index of wear resistance} = (S/T) \times 100 \, (\%)$$

wherein S was the volume loss of a specimen of Comparative Example 1 and T was the volume loss of a test specimen.
(3) Tan δ: It was measured under the following conditions by means of a viscoelastic spectrometer (Model VE5F-III) made by Iwamoto Seisakusho:
frequency: 50 Hz
dynamic strain ratio: ±1%
measuring temperature: 25° C. ±1° C.
initial load: 160 g It was represented by an index on the basis that tan δ value of Comparative Example 1 was 100, wherein the smaller the value, the lower the heat generation.

The evaluation was made with respect to the compounding composition shown in Table 3 with carbon powders having properties shown in Table 2.

Among carbon blacks of Table 2, Nos. 1 and 2 are examples not satisfying the properties usable for the tire according to the invention, and Nos. 3 and 4 are carbon blacks suitable for the tire according to the invention.

In Table 4 are shown results of actual running test in the retreaded tires.

TABLE 3

| | Comparative Example 1 | Comparative Example 2 | Example 1 | Example 2 | Comparative Example 3 | Comparative Example 4 | Example 3 |
|---|---|---|---|---|---|---|---|
| Rubber composition | A | B | C | D | E | F | G |
| Carbon black used No. | 1 | 2 | 3 | 4 | 4 | 1 | 4 |
| Compounding recipe (part by weight) | | | | | | | |
| natural rubber | 100 | 100 | 100 | 100 | 100 | 70 | 70 |
| BR *1 | — | — | — | — | — | 30 | 30 |
| carbon black | 50 | 50 | 50 | 50 | 80 | 50 | 50 |
| stearic acid | 2 | 2 | 2 | 2 | 2 | 2 | 2 |
| antioxidant *2 | 1 | 1 | 1 | 1 | 1 | 1 | 1 |
| zinc white | 4 | 4 | 4 | 4 | 4 | 4 | 4 |
| vulcanization accelerator (MSA) | 0.8 | 0.8 | 0.8 | 0.8 | 0.8 | — | — |
| vulcanization accelerator (CZ) | — | — | — | — | — | 1.5 | 1.5 |
| sulfur | 2 | 2 | 2 | 2 | 2 | 1 | 1 |
| Wear resistance | 100 | 102 | 108 | 113 | 108 | 115 | 126 |

TABLE 3-continued

|  | Comparative Example 1 | Comparative Example 2 | Example 1 | Example 2 | Comparative Example 3 | Comparative Example 4 | Example 3 |
|---|---|---|---|---|---|---|---|
| tan δ *3 | 100 | 99 | 90 | 91 | 131 | (100) *4 86 (100) *4 | (110) *4 79 (92) *4 |

*1 BRO1 made by Japan Synthetic Rubber Co., Ltd. (cis-1,4-bond content: 96%)
*2 Santoflex 13
*3 the smaller the value, the lower the heat generation
*4 value on the basis that Comparative Example 4 was 100

TABLE 4

|  | Comparative Example 5 | Example 4 | Example 5 | Comparative Example 6 | Example 6 |
|---|---|---|---|---|---|
| Rubber composition | A | D | G | H | I |
| Carbon black used No. | 1 | 4 | 4 | 1 | 4 |
| Compounding recipe (part by weight) | | | | | |
| natural rubber | 100 | 100 | 70 | 60 | 60 |
| BR *1 | — | — | 30 | — | — |
| SBR *2 | — | — | — | 40 | 40 |
| carbon black | 50 | 50 | 50 | 50 | 50 |
| stearic acid | 2 | 2 | 2 | 2 | 2 |
| antioxidant *3 | 1 | 1 | 1 | 1 | 1 |
| zinc white | 4 | 4 | 4 | 4 | 4 |
| vulcanization accelerator (MSA) | 0.8 | 0.8 | — | — | — |
| vulcanization accelerator (CZ) | — | — | 1.5 | 1.4 | 1.4 |
| sulfur | 2 | 2 | 1 | 1 | 1 |
| Wear resistance | 100 | 109 | 122 | 98 | 104 |

*1 BRO1 made by Japan Synthetic Rubber Co., Ltd. (cis-1,4-bond content: 96%)
*2 #1500 made by Japan Synthetic Rubber Co., Ltd. (bound styrene content: 23.5%)
*3 Santoflex 13

Examples 1-6 in Tables 4 and 5 are pneumatic tires according to the invention, while Comparative Examples 1-6 are pneumatic tires using carbon black powder containing surface functional groups outside the range of the invention. As seen from the results of Tables 3 and 4, the wear resistance and rolling resistance are considerably improved in the pneumatic tires according to the invention.

What is claimed is:

1. A pneumatic tire comprising a tread portion, a pair of side wall portions and a pair of bead portions, wherein said tread portion comprises a rubber composition comprising
   (A) 100 parts by weight of at least one rubber selected from the group consisting of natural rubber and diene series synthetic rubbers and
   (B) 30-70 parts by weight of powdery carbon black having a specific surface area of nitrogen adsorption ($N_2SA$) of 125-250 $m^2/g$ and a DBP absorption number of compressed sample (24M4DBPA) of 80-140 ml/100 g and containing surface functional groups, wherein the amount of functional groups which have been acetylated with acetic anhydride (ACF) and the amount of functional groups which have been reacted with hydroxyamine to form oxime (OXF) satisfy a relationship represented by the following equation (1)

$$ACF \geq 0.125 + 2 \times OXF \qquad (1)$$

wherein ACF and OXF are measured in milliequivalents per 1 g of carbon black (meq/g).

2. The pneumatic tire according to claim 1, wherein the hydrogen ion concentration of said carbon black in a suspension slurry (pH) and total acidity (TA) calculated by subjecting an aqueous solution of sodium hydroxide and powdery carbon black to a neutralization reaction with hydrochloric acid satisfy a relationship represented by the following equation (2)

$$pH \geq 4.5 + 100 \times TA \qquad (2)$$

wherein TA is measured in milliequivalents per 1 g of carbon black (meq/g).

3. The pneumatic tire according to claim 1, wherein carbon black of said rubber composition is non-granulated carbon black.

4. The pneumatic tire according to claim 1, wherein ACF is 0.05 meq/g or more.

5. The pneumatic tire according to claim 2, wherein the pH is 1.0 or more.

6. The pneumatic tire according to claim 1, wherein the at least one rubber is a rubber matrix consisting of natural rubber and styrene-butadiene rubber having a bound styrene content of not less than 20% at a blending ratio of 100:0–10:90 parts by weight or a rubber matrix consisting of natural rubber and butadiene rubber having a cis-1,4-bond content of not less than 80% at a blending ratio of 100:0–30:70 parts by weight.

* * * * *